Patented Oct. 5, 1937

2,094,784

UNITED STATES PATENT OFFICE 2,094,784

RESISTANCE WELDING ELECTRODE

Edmund W. Bremer, Weehawken Township, Hudson County, N. J., assignor to Electroloy Company, Inc., New York, N. Y., a corporation of New Jersey No Drawing. Application April 28, 1937, Serial No. 139,368

5 Claims. (Cl. 219—4)

This invention relates to electrical resistance welding and more particularly to improvements in resistance welding electrodes for use in spot, seam, flash, butt and projection welding and contemplates the provision of electrodes made in whole or in part of novel alloys consisting of copper, silver, cobalt and beryllium.

The principle involved in the art of electric resistance welding is that of causing high currents of electricity to pass through the pieces of metal which are being welded, thereby generating heat at the point of contact, which is the point of greatest resistance, while, at the same time, mechanical pressure is exerted through the electrodes to force the pieces of metal together. As the welding current heats the metal at the junction to a welding temperature, the electrode pressure completes the union and the weld is effected.

As is well known, the electrodes differ in form according to the type of welding to be done and are variously made in the form of rods, dies, splines, wheels and the like. They may all be classed as "pressure exerting electrodes". The electrodes conduct the welding current to the pieces being welded and must therefore be made of a material having a good electrical conductivity. In addition, these electrodes serve to clamp and apply the necessary pressure to the pieces being welded and for this function must have sufficient hardness to withstand such pressure without becoming deformed. The efficiency of an electrode depends upon the number of welds which can be made with it before it becomes so deformed as to require reshaping.

The copper electrodes originally used for the purpose of conducting the electrical current and applying the necessary pressure to the parts being welded would deform rapidly and required frequent remachining. The metal alloys which have heretofore been used for electrode purposes in place of plain copper, while superior to copper, nevertheless do not fully satisfy the requirements of conductivity and hardness for all purposes.

The object of the present invention is to produce an electrode having maximum electrical conductivity in conjunction with a high degree of mechanical strength and hardness.

Electrodes made in accordance with the present invention comprise an alloy formed of copper, silver, cobalt and beryllium. At present it is preferred to use an alloy having about the following proportions by weight.

Example 1.—97.20% copper, 1.0% silver, 1.50% cobalt and 0.30% beryllium. The electrical conductivity of this alloy after age-hardening or heat treating is 65% of that of copper. The Rockwell hardness after heat treating and cold working is 90 on the B scale, using a $\frac{1}{16}$" diameter steel ball with 100 kilogram load.

Electrodes made either entirely of this alloy, or faced with this alloy, are found to have an increased life of from twelve to thirty times that of copper electrodes and to be capable of making many more welds than electrodes made of previously known alloys.

The presence of silver in the alloy is of particular importance. It has been found that the addition of small amounts of silver to the other ingredients, within the range hereinafter stated, has the effect of increasing both the conductivity and the hardness, producing an alloy having unusually high conductivity for the hardness attained.

It has been found that alloys satisfactory for the purposes stated may be made with varying percentages of the ingredients within the following range of percentages by weight: 96.85% to 98.50% copper, 0.20% to 1.0% silver, 1.0% to 1.75% cobalt and 0.30% to 0.40% beryllium.

In addition to the preferred example given above, the following percentages by weight have been found suitable.

Example 2.—96.85% copper, 1.0% silver, 1.75% cobalt and 0.40% beryllium.

Example 3.—98.5% copper, 0.20% silver, 1.0% cobalt and 0.30% beryllium.

Within the ranges stated the minimum electrical conductivity is 50% that of copper and the minimum Rockwell hardness is 75 on the B scale, using a $\frac{1}{16}$" diameter steel ball and a 100 kilogram load.

As the present alloy has the characteristics of being heat treatable and age hardened, it is, sometimes, more practical for this alloy to be machined into the desired shapes prior to heat treatment. In some instances, it is preferable that this alloy be used only as a facing material on the electrodes. In this case it is necessary to mechanically attach or silver braze it to the electrode body. In these instances also, it may be preferable to heat treat after this work has been accomplished.

The foregoing specific examples are to be taken as merely illustrative of the invention as defined in the following claims.

What is claimed is:

1. A pressure exerting electrode comprising an alloy containing, by weight, from 96.85% to 98.5% copper, from 0.2% to 1.0% silver, from 1.0% to 1.75% cobalt and from 0.3% to 0.4% beryllium.

2. A pressure exerting electrode comprising an alloy containing, by weight, about 97.2% copper, about 1.0% silver, about 1.5% cobalt and about 0.3% beryllium.

3. A pressure exerting electrode comprising an alloy containing, by weight, about 96.85% copper, about 1.0% silver, about 1.75% cobalt and about 0.4% beryllium.

4. A pressure exerting electrode comprising an alloy containing, by weight, about 98.5% copper, about 0.2% silver, about 1.0% cobalt and about 0.3% beryllium.

5. A resistance welding electrode comprising an alloy containing from 0.2% to 1.0% silver, from 1.0% to 1.75% cobalt, from 0.3% to 0.4% beryllium and the remainder copper and having an electrical conductivity of at least 50% that of copper and a Rockwell hardness of at least 75 on the B scale, using a $\frac{1}{16}''$ diameter steel ball with a 100 kilogram load.

EDMUND W. BREMER.

DISCLAIMER 2,094,784.—*Edmund W. Bremer*, Weehawken Township, Hudson County, N. J. RESISTANCE WELDING ELECTRODE. Patent dated October 5, 1937. Disclaimer filed June 7, 1939, by the assignee, *Electroloy Company, Inc.*

Hereby enters this disclaimer to claims 1, 2, and 5 of said specification.

[*Official Gazette July 4, 1939.*]